Aug. 19, 1969 ISOJIRO NAKAKUBO ET AL 3,461,543

BRAZING PROCESS

Filed Dec. 6, 1965

United States Patent Office 3,461,543
Patented Aug. 19, 1969

3,461,543
BRAZING PROCESS
Isojiro Nakakubo, Tokyo, and Takeharu Watanabe, Narashino, Japan, assignors to Yawata Welding Electrode Co., Ltd., Tokyo, Japan, a company of Japan
Filed Dec. 6, 1965, Ser. No. 511,788
Claims priority, application Japan, Dec. 4, 1964, 39/68,096; Jan. 8, 1965, 40/565
Int. Cl. B23k 1/04
U.S. Cl. 29—498.5         4 Claims

ABSTRACT OF THE DISCLOSURE

A brazing process is provided in which a layer of flux is disposed between the metal surfaces to be joined and a brazing solder is placed adjacent to the surfaces. A solid heat generating agent formed to match the shape of the surfaces to be joined is then placed about the surfaces to be joined. Upon ignition, the heat generating agent melts the solder and the flux. The metal surfaces are first cleaned by the flux and then the melted brazing solder is drawn into the space between the metal surfaces to effect the braze.

---

This invention relates to a process for brazing by the use of a solid heat generating agent.

Brazing is a method for the joining of the metals. It is a metallurgical or physical process wherein a brazing material is melted and diffused between the metals to be joined by heating, with an external heat source such as high frequency heater or gas burner, the edges of the metals to be joined to a temperature sufficient to accomplish the intermetallic diffusion of the brazing material.

However, in the above process, there are some practical difficulties due to the degree of cleanliness required; the shape of the joining edge, the skill of the operator, and the heating device. For example, in the case of a high frequency heater the operation is limited to the vicinity of the factory, because such an apparatus is large and an electric source of great capacity is required. In the case of a gas burner, there are also difficulties such as the difficulty of obtaining uniform heating at a suitable temperature, the transfer of the fuel tank, and the degree of skill required to join the metals by effecting simultaneous heating of the base metal and melting of the brazing solder.

In spite of its utility, brazing has been used little and is scarcely utilized at all as a field process for joining metal.

The instant invention minimizes the above difficulties of brazing, which is improved thereby for use as a convenient field joining process, wherein a base metal is heated to a brazing temperature by a solid heat generating agent disposed on the part of said base metal to be brazed, in an amount which is calculated to generate sufficient heat to bring the brazing solder to a suitable brazing temperature. Initially a flux is inserted between the surfaces to be joined, a brazing solder is disposed on the suitable section and the joining surfaces are fixed. Heat is then generated by igniting the solid heat generating agent to effect the brazing.

The solid heat generating agent is preferably a composition of 30–75% Al, 40% or less Mg, 20% or less mill scale, 20% or less MnO$_2$, 10% or less cryolite or similar fluorides and 10–30% silica sand. Furfural resin or other thermosetting organic resins can be employed in the molding of the mixture to a shaped solid.

In the present invention, the joint surfaces of base metal are cleansed, the flux is coated thereon; the braze material and heat generating agent are put in place and the joint surfaces are then fixed. The solid heat generating agent is then ignited to heat the section to be joined. As the flux is melted and spreads entirely throughout the closely contacted surfaces, the brazing material is drawn instantaneously into the closely contacted surfaces by a capillary or wetting action and fills the surfaces to be joined. The smaller the gap between the surfaces to be joined, the stronger the capillary or wetting action. Accordingly, in this invention an extremely thin layer of braze is formed over the joined surfaces and a rigid bond is produced thereby.

The invention is further explained in detail, with reference to brazing in the field.

While flash butt welding is employed widely as a process for joining pipe sections, use thereof is limited to a factory operation and is unsuitable for a field operation. This is due to the fact that a flash butt welding machine is large, and an electric source of great capacity is required. Arc welding or gas welding is employed in the field; however, in this case the transfer of the apparatus and the dispatch of a skilled operator is also necessary. Thus, the cost is very high, when for example, a branch pipe is to be welded to an existing main pipe at a remote place.

In applying the process of the present invention, it is sufficient in preparing for brazing to machine an edge of a branch pipe to be adapted to an external surface of a main pipe; to mold a solid heat generating agent into a shape which is adaptable to an external diameter of the branch pipe; to prepare the linear brazing solder and the paste, which is the flux treated with a solvent; and to bring them all to the actual spot. The transfer is simple and convenient. The braze is then effected at the site where the surfaces are to be joined by igniting the heat generating agent.

Thus, in a field operation, it is sufficient to first cleanse the external surface to be joined of a main pipe and to coat the flux paste thereon; to insert the brazing solder into the inside edge of the branch pipe to be joined; to insert the molded solid heat generating agent onto the external edge; then to coat the flux paste on the edge of the branch pipe; then to adapt said edge to the corresponding section of said main pipe; to compress the branch pipe to contact closely the surfaces to be joined together and then to ignite the solid heat generating agent. Consequently, a skillful operator is unnecessary. The field operation of joining the pipes is effected very conveniently, surely and cheaply by the application of the process of the present invention.

Further description is made with respect to the accompanying drawing in which.

Some examples of the invention are shown below in conjunction with the accompanying drawing, but they are only illustrative and not intended to limit the invention.

EXAMPLE 1

This is an illustration of the application of the present invention to an operation for T-joint of pipe.

Figure 1:
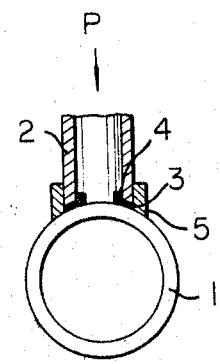
FIG. 1 is a sectional elevation of a T-joint of pipe, illustrating the application of the present process.

Referring to FIG. 1, numeral 1 represents a main pipe, 2 represents a branch pipe to be joined, 3 represents a coated layer of flux paste, 4 represents a ribbon of brazing solder and 5 represents a sleeve-shaped solid heat generating agent.

The solid heat generating agent used in this example has a composition of 68.2% Al, 11.2% mill scale, 5.3% MnO$_2$, 1.3% NaF, and 10.0% silica sand, and is molded into a sleeve shape by addition of 4% furfural, baked at 200° C. for 30 min., and solidified.

Silver solder having a composition of 40% Ag, 40% Cu and 20% Zn made into ribbon, is employed as the brazing solder.

The flux used is of the fluorine type, and has a composition of 40% borax, 10% sodium chloride, 10% potassium chloride and 40% cryolite. Hot water is added to above composite, and the composite is then kneaded. Then it is treated with alcohol to obtain a paste, which said paste is used in the operation.

First, the section to be joined of the main pipe 1 is brushed with a wire brush and polished with sand paper to remove its scale. Then the paste of flux is coated on the cleansed joint surface.

Subsequently, a ribbon-like brazing solder 4 is inserted into the inner edge of the branch pipe 2. A sleeve-shaped solid heat generating agent 5 is inserted onto external edge. A paste of flux 3 is then coated on the end of branch pipe. A simple supporting frame (not shown) can be constructed to fix the surface to be joined to the main pipe 1 during brazing. The branch pipe 2 to be joined is supported in position with the supporting frame, and the branch pipe 2 is pressed firmly against the main pipe 1, such as by revolving a screw bolt which is screwed on the supporting frame.

After the position of the solid heat generating agent is adjusted to be at the joint, it is ignited. The required time for heating to a brazing temperature is about 2 minutes. The section at the joint is thereby heated uniformly to the brazing temperature, and the brazing is complete. After the completion of the braze and setting for 2 minutes thereafter, the residue of heat generating agent is removed. After 1 minute more has elapsed, the piece can be removed from the support.

A pressure test for the tightness of the joint carried out after the brazing was completed and it was found that the pressure required for leakage was 10 kg./cm.$^2$. The tensile strength of the joint was found to be 50 kg./mm.$^2$ or more.

EXAMPLE 2

Figure 2:
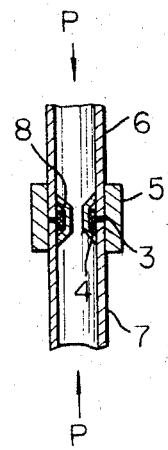
FIG. 2 is a sectional elevation of a butt joint of pipe.

FIG. 2 is illustrative of the application of the invention to the butt jointing of pipe.

With respect for FIG. 2, numeral 6 and 7 represent pipes to be joined, 3 represents paste of flux, 4 represents ribbon-like brazing solder, 5 represents sleeve-shaped solid heat generating agent and 8 represents a packing block which is disposed at the back of the brazing solder to reinforce the joint.

The heat generating agent, solder, and flux used in this example are all similar to that of Example 1. First the section of the pipes 6 and 7 to be joined are cleansed by means of a wire brush or sanding and all scale is removed therefrom. Next, a paste of the flux 3 is applied to the cleansed surfaces to be joined. Then a ribbon of the brazing solder 4 is inserted within the inner edges of the surfaces to be joined and a packing block 8 is disposed around the solder to reinforce the joint and to hold the solder in place. The sections are then fixed by a supporting frame in place (not shown). A sleeve-shaped solid heat generating agent 5 shaped to the pipe is then disposed around the butted portions at the joint. After so placing the heat generating agent, it is ignited. In about two minutes the sections are heated uniformly to a brazing temperature, the solder is melted thereby, and the brazing is completed. After a further time of about two minutes, setting of the braze is complete, and the residue of the heat generating agent can be removed. A short while thereafter, the packing block 8 may also be removed, and the joined pipe is ready for use.

We claim:

1. A brazing process comprising placing flux between the metal surfaces to be joined; disposing a brazing solder adjacent said metal surfaces; placing about said metal surfaces to be joined a solid flammable heat generating agent formed to match the shape of the metal surfaces to be joined, said heat generating agent being adapted to apply sufficient heat to melt the brazing solder and effect the braze such that upon ignition of the heat generating agent, the metal surfaces to be joined are first cleaned by the flux and then the melted brazing solder is drawn between the metal surfaces thereby brazing the surfaces together upon solidification of the brazing solder.

2. A brazing process in accordance with claim 1 including holding the surfaces in a fixed relation to each other during brazing.

3. A brazing process in accordance with claim 1 in which the heat generating agent comprises from about 30 to about 75% aluminum, up to 40% magnesium, up to 20% mill scale, up to 20% manganese dioxide, up to 10% of a fluoride and from about 10 to about 30% silica sand.

4. A brazing process in accordance with claim 1 including the step of forming the heat generating agent to match the shape of the metal surfaces to be joined.

References Cited

UNITED STATES PATENTS

| 3,059,324 | 10/1962 | Goff | 29—498.5 X |
| 3,070,874 | 1/1963 | Davis | 29—498.5 X |
| 3,308,532 | 3/1967 | Long | 29—498.5 X |

FOREIGN PATENTS 936,972    9/1963    Great Britain.

JOHN F. CAMPBELL, Primary Examiner

J. L. CLINE, Assistant Examiner